United States Patent
Hayakawa et al.

(10) Patent No.: US 11,511,473 B2
(45) Date of Patent: Nov. 29, 2022

(54) METHOD FOR PRODUCING POLYESTER FILM HAVING FURANDICARBOXYLATE UNIT

(71) Applicants: TOYOBO CO., LTD., Osaka (JP); Furanix Technologies B.V., Amsterdam (NL)

(72) Inventors: Shota Hayakawa, Otsu (JP); Yukihiro Numata, Otsu (JP); Katsuya Ito, Otsu (JP); Jun Inagaki, Osaka (JP); Toshiyuki Shimizu, Inuyama (JP); Shoichi Gyobu, Osaka (JP); Chikao Morishige, Osaka (JP); Jesper Gabriel Van Berkel, Amsterdam (NL)

(73) Assignees: TOYOBO CO., LTD., Osaka (JP); FURANIX TECHNOLOGIES B.V., Amsterdam (NL)

( * ) Notice: Subject to any disclaimer, the term of this patent is extended or adjusted under 35 U.S.C. 154(b) by 271 days.

(21) Appl. No.: 16/490,205

(22) PCT Filed: Feb. 28, 2018

(86) PCT No.: PCT/JP2018/007404
§ 371 (c)(1),
(2) Date: Aug. 30, 2019

(87) PCT Pub. No.: WO2018/159648
PCT Pub. Date: Sep. 7, 2018

(65) Prior Publication Data
US 2021/0016484 A1 Jan. 21, 2021

(30) Foreign Application Priority Data
Mar. 1, 2017 (WO) .................. PCT/JP2017/008200

(51) Int. Cl.
B29C 48/305 (2019.01)
B29C 48/08 (2019.01)
B29C 48/00 (2019.01)
B29C 55/12 (2006.01)
B29C 71/02 (2006.01)
B29C 71/00 (2006.01)
B29C 48/885 (2019.01)
B29K 67/00 (2006.01)

(52) U.S. Cl.
CPC ........ *B29C 48/305* (2019.02); *B29C 48/0018* (2019.02); *B29C 48/08* (2019.02); *B29C 55/12* (2013.01); *B29C 71/0063* (2013.01); *B29C 71/0072* (2013.01); *B29C 71/02* (2013.01); *B29C 48/885* (2019.02); *B29C 2071/022* (2013.01); *B29C 2948/92152* (2019.02); *B29K 2067/00* (2013.01); *B29K 2995/0053* (2013.01)

(58) Field of Classification Search
CPC ... B29C 48/305; B29C 48/0018; B29C 55/12; B29C 48/08; B29C 2948/92152; B29C 48/885; B29C 48/022; B29C 48/88; B29C 71/00; B29C 71/02; B29C 2071/022; B29C 71/0063; B29K 2067/00; B29K 2995/0053; B29K 2067/003; B29K 2067/006; B32B 27/16; B32B 27/18; B32B 27/36; B32B 27/10; B32B 27/08; B32B 2255/10; B32B 2250/02; B32B 2307/308; B32B 2307/518; B32B 2255/20; B32B 2307/732; B32B 2439/70; B32B 2307/726; B32B 2255/205; B32B 2307/7244; B32B 2250/03; B32B 2250/244; B32B 2307/306; C08J 2367/02; C08J 5/18; C08L 67/02; C08G 63/672

See application file for complete search history.

(56) References Cited

U.S. PATENT DOCUMENTS

| | | | |
|---|---|---|---|
| 2,551,731 A | 5/1951 | Drewitt et al. |
| 4,439,479 A | 3/1984 | Kanai et al. |
| 5,096,784 A | 3/1992 | Culbertson et al. |
| 5,128,206 A | 7/1992 | Fiard et al. |
| 6,254,996 B1 | 7/2001 | Fukuda et al. |
| H1982 H | 8/2001 | Dunn et al. |
| 10,407,555 B2 | 9/2019 | Inagaki et al. |
| 10,941,244 B2 | 3/2021 | Inagaki et al. |

(Continued)

FOREIGN PATENT DOCUMENTS

| | | |
|---|---|---|
| CN | 101899145 A | 12/2010 |
| CN | 101959941 A | 1/2011 |

(Continued)

OTHER PUBLICATIONS

European Patent Office, Extended European Search Report in European Patent Application No. 18760795.7 (dated Dec. 11, 2020).

(Continued)

*Primary Examiner* — Jeffrey M Wollschlager
(74) *Attorney, Agent, or Firm* — Leydig, Voit & Mayer, Ltd.

(57) ABSTRACT

It is provided that a method for producing a biaxially oriented polyester film that can be used for industrial and packaging applications. A method for producing a biaxially oriented polyester film, comprising: a step of feeding a polyester resin into an extruder, a step of extruding the molten polyester resin from an extruder to obtain a molten resin sheet at 250 to 310° C., a step of attaching the molten resin sheet closely to a cooling roll by an electrostatic application method to obtain an unstretched sheet, and a step of biaxially stretching the unstretched sheet, wherein the polyester resin fulfills the following (A) to (C): (A) the polyester resin comprises a polyethylene furandicarboxylate resin composed of a furandicarboxylic acid and ethylene glycol; (B) an intrinsic viscosity of the polyester resin is 0.50 dL/g or more; (C) a melt specific resistance value at 250° C. of the polyester resin is $3.0 \times 10^7$ Ω·cm or less.

14 Claims, 1 Drawing Sheet

(56) References Cited

U.S. PATENT DOCUMENTS

| | | | |
|---|---|---|---|
| 2004/0146724 | A1 | 7/2004 | Peiffer et al. |
| 2005/0100723 | A1 | 5/2005 | Tanaka et al. |
| 2008/0015108 | A1 | 1/2008 | Yamamoto et al. |
| 2008/0038539 | A1 | 2/2008 | Yokota et al. |
| 2009/0032602 | A1 | 2/2009 | Nishi et al. |
| 2009/0124763 | A1 | 5/2009 | Matsuda et al. |
| 2011/0218316 | A1* | 9/2011 | Drysdale ............ C08G 63/6826 528/299 |
| 2012/0053317 | A1 | 3/2012 | Matsumura et al. |
| 2012/0178897 | A1 | 7/2012 | Nozawa |
| 2012/0207956 | A1 | 8/2012 | Matsuda et al. |
| 2012/0258299 | A1 | 10/2012 | Matsuda et al. |
| 2012/0288692 | A1 | 11/2012 | Broyles et al. |
| 2012/0288693 | A1 | 11/2012 | Stanley et al. |
| 2013/0011631 | A1 | 1/2013 | Sakellarides et al. |
| 2013/0095271 | A1 | 4/2013 | Carman, Jr. et al. |
| 2013/0344345 | A1 | 12/2013 | Sakellarides et al. |
| 2014/0004286 | A1 | 1/2014 | Sakellarides et al. |
| 2014/0099455 | A1 | 4/2014 | Stanley et al. |
| 2014/0234493 | A1* | 8/2014 | Forloni ....................... C09J 7/35 426/113 |
| 2014/0322463 | A1* | 10/2014 | Bashir ........................ C08J 5/18 428/35.2 |
| 2014/0336349 | A1 | 11/2014 | Sipos et al. |
| 2014/0363546 | A1 | 12/2014 | Zhou et al. |
| 2015/0004387 | A1 | 1/2015 | Sargeant et al. |
| 2015/0119548 | A1 | 4/2015 | Takahashi et al. |
| 2015/0141584 | A1 | 5/2015 | Saywell et al. |
| 2015/0251395 | A1* | 9/2015 | Haak ........................ B32B 27/20 428/143 |
| 2015/0307704 | A1 | 10/2015 | Bhattacharjee et al. |
| 2015/0343746 | A1 | 12/2015 | Bhattacharjee et al. |
| 2015/0353692 | A1 | 12/2015 | Bhattacharjee et al. |
| 2016/0002395 | A1 | 1/2016 | Matsuda et al. |
| 2016/0108171 | A1 | 4/2016 | Haruta et al. |
| 2016/0200862 | A1 | 7/2016 | Bastioli et al. |
| 2016/0272771 | A1 | 9/2016 | Goto et al. |
| 2016/0319066 | A1 | 11/2016 | Shimoharai et al. |
| 2017/0297256 | A1* | 10/2017 | Kolstad .................... B32B 27/32 |
| 2017/0368807 | A1* | 12/2017 | Sakellarides ........... B32B 27/22 |
| 2018/0170019 | A1 | 6/2018 | Fayet et al. |
| 2018/0244878 | A1* | 8/2018 | Inagaki ................... C08G 63/16 |
| 2018/0311939 | A1 | 11/2018 | Larrieu et al. |
| 2019/0106534 | A1* | 4/2019 | Inagaki ................... B29C 71/02 |
| 2019/0169384 | A1 | 6/2019 | Goto et al. |
| 2019/0225745 | A1* | 7/2019 | Sakano ................... B32B 27/18 |
| 2019/0366616 | A1 | 12/2019 | Berny et al. |
| 2019/0389189 | A1 | 12/2019 | Hayakawa et al. |
| 2020/0269559 | A1* | 8/2020 | Inagaki ..................... C08J 7/043 |
| 2020/0269560 | A1* | 8/2020 | Inagaki .................. C08J 7/0423 |
| 2021/0147618 | A1 | 5/2021 | Inagaki et al. |

FOREIGN PATENT DOCUMENTS

| | | |
|---|---|---|
| CN | 103459148 A | 12/2013 |
| CN | 104053535 A | 9/2014 |
| CN | 104955646 A | 9/2015 |
| CN | 105143967 A | 12/2015 |
| EP | 2511320 A1 | 10/2012 |
| EP | 3438164 A1 | 2/2019 |
| JP | H11-010725 A | 1/1999 |
| JP | 2000-119414 A | 4/2000 |
| JP | 2001-001399 A | 1/2001 |
| JP | 2001-232739 A | 8/2001 |
| JP | 2001-342267 A | 12/2001 |
| JP | 2002-370277 A | 12/2002 |
| JP | 2003-071969 A | 3/2003 |
| JP | 2003-200546 A | 7/2003 |
| JP | 2007-118476 A | 5/2007 |
| JP | 3982385 B2 | 9/2007 |
| JP | 4470491 B2 | 6/2010 |
| JP | 4881127 B2 | 2/2012 |
| JP | 2012-094699 A | 5/2012 |
| JP | 2012-229395 A | 11/2012 |
| JP | 2013-155389 A | 8/2013 |
| JP | 2015-157411 A | 9/2013 |
| JP | 2014-043571 A | 3/2014 |
| JP | 2014-073598 A | 4/2014 |
| JP | 2015-506389 A | 3/2015 |
| JP | 2015-098612 A | 5/2015 |
| TW | 200951163 A | 12/2009 |
| TW | 201518399 A | 5/2015 |
| TW | 201615742 A | 5/2016 |
| WO | WO 2012/142271 A1 | 10/2012 |
| WO | WO 2013/097013 A1 | 7/2013 |
| WO | WO 2014/100256 A2 | 6/2014 |
| WO | WO 2014/100265 A1 | 6/2014 |
| WO | WO 2015/093524 A1 | 6/2015 |
| WO | WO 2016/032330 A1 | 3/2016 |
| WO | WO 2016/123209 A1 | 8/2016 |
| WO | WO 2017/038092 A1 | 3/2017 |
| WO | WO2017115736 * | 7/2017 |
| WO | WO2017115737 * | 7/2017 |
| WO | WO 2017/169553 A1 | 10/2017 |
| WO | WO2018012572 * | 1/2018 |

OTHER PUBLICATIONS

China National Intellectual Property Administration, The First Office Action in Chinese Patent Application No. 201880015158.2 (dated Jul. 6, 2021).

Japanese Patent Office, Notice of Reasons for Refusal in Japanese Patent Application No. 2019-503041 (dated Aug. 10, 2021).

Taiwanese Patent Office, First Office Action in Taiwanese Patent Application No. 107106834 (dated Jul. 20, 2021).

Hachihama et al., "Synthesis of Polyesters containing Furan Ring," *Technology Reports of the Osaka University*, 8(333): 475-480 (1958).

Japanese Patent Office, International Search Report in International Patent Application No. PCT/JP2018/007404 (dated May 29, 2018).

Korean Intellectual Property Office, Notice of Preliminary Rejection in Korean Patent Application No. 10-2019-7028220 (dated Jan. 20, 2022).

Taiwan Intellectual Property Office, Rejection Decision in Taiwanese Patent Application No. 107106834 (dated Dec. 9, 2021).

Gandini et al., "The Furan Counterpart of Poly(ethylene terephthalate): An Alternative Material Based on Renewable Resources," *J. Polym. Sci. Part A Polym. Chem.*, 47(1): 295-298 (2009).

Nakajima et al., "The Recent Developments in Biobased Polymers toward General and Engineering Applications: Polymers that Are Upgraded from Biodegradable Polymers, Analogous to Petroleum-Derived Polymers, and Newly Developed," *Polymers*, 9: 523 (2017).

Omnexus, "Polyethylene Furanoate (PEF)—The Rising Star Amongst Today's Bioplastics" (2019) [obtained at: https://omnexus.specialchem.com/selection-guide/polyethylene-furanoate-pef-bioplastic].

Australian Patent Office, Examination Report in Australian Patent Application No. 2016381909 (dated May 5, 2020).

Australian Patent Office, Examination Report No. 1 in Australian Patent Application No. 2017242303 (dated Jun. 29, 2020).

China National Intellectual Property Administration, First Office Action in Chinese Patent Application No. 201680076574.4 (dated Aug. 21, 2019).

China National Intellectual Property Administration, First Office Action in Chinese Patent Application No. 201680076573.X (dated Aug. 30, 2019).

China National Intellectual Property Administration, The Second Office Action in Chinese Patent Application No. 201680076574.4 (dated Mar. 16, 2020).

China National Intellectual Property Administration, Rejection Decision in Chinese Patent Application No. 201680076474.4 (dated Aug. 24, 2020).

China National Intellectual Property Administration, First Office Action in Chinese Patent Application No. 201780021682.6 (dated Dec. 4, 2020).

China National Intellectual Property Administration, First Office Action in Chinese Patent Application No. 201880015127.7 (dated Oct. 22, 2020).

(56) References Cited

OTHER PUBLICATIONS

China National Intellectual Property Administration, The Second Office Action in Chinese Patent Application No. 201880015127.7 (dated Apr. 8, 2021).
European Patent Office, Extended European Search Report in European Patent Application No. 16881712.0 (dated Jun. 26, 2019).
European Patent Office, Extended European Search Report in European Patent Application No. 17774098.2 (dated Nov. 8, 2019).
European Patent Office, International Search Report in International Patent Application No. PCT/JP2016/003976 (dated Nov. 23, 2016).
European Patent Office, Communication Pursuant to Article 94(3) EPC in European Patent Application No. 16881711.2 (dated Nov. 4, 2020).
European Patent Office, Extended European Search Report in European Patent Application No. 18760798.1 (dated Dec. 8, 2020).
Indian Patent Office, Examination Report in Indian Patent Application No. 201847027693 (dated May 15, 2020).
Japanese Patent Office, Notification of Reasons for Refusal in Japanese Patent Application No. 2017-506943 (dated Sep. 13, 2017).
Japanese Patent Office, International Search Report in International Patent Application No. PCT/JP2017/008902 (dated May 16, 2017).
Japanese Patent Office, International Search Report in International Patent Application No. PCT/JP2016/088617 (dated Mar. 21, 2017).
Japanese Patent Office, International Search Report in International Patent Application No. PCT/JP2016/088618 (dated Mar. 21, 2017).
Japanese Patent Office, International Search Report in International Patent Application No. PCT/JP2018/007405 (dated May 29, 2018).
Japanese Patent Office, Notice of Reasons for Refusal in Japanese Patent Application No. 2017-559174 (dated Jan. 19, 2021).
Japanese Patent Office, Notice of Reasons for Refusal in Japanese Patent Application No. 2017-559175 (dated Jan. 19, 2021).
Japanese Patent Office, Notice of Reasons for Refusal in Japanese Patent Application No. 2018-508875 (dated Mar. 2, 2021).
Japanese Patent Office, Notice of Reasons for Refusal in Japanese Patent Application No. 2019-503042 (dated Aug. 10, 2021).
Korean Intellectual Property Office, Notice of Reason for Refusal in Korean Patent Application No. 10-2018-7030855 (dated Aug. 19, 2021).
Taiwan Intellectual Property Office, First Office Action in Taiwanese Patent Application No. 105143160 (dated Apr. 27, 2020).
Taiwan Intellectual Property Office, First Office Action in Taiwanese Patent Application No. 105143162 (dated Apr. 27, 2020).
Taiwan Intellectual Property Office, First Office Action in Taiwanese Patent Application No. 106107343 (dated Jun. 16, 2020).
Taiwan Intellectual Property Office, Second Office Action in Taiwanese Patent Application No. 105143160 (dated Mar. 30, 2021).
Taiwan Intellectual Property Office, First Office Action in Taiwanese Patent Application No. 107106833 (dated Apr. 16, 2021).
Taiwan Intellectual Property Office, First Office Action in Taiwanese Patent Application No. 109146750 (dated Apr. 30, 2021).
Taiwan Intellectual Property Office, Rejection Decision in Taiwanese Patent Application No. 105143162 (dated Jul. 21, 2021).
Korean Intellectual Property Office, Notice of Final Rejection in Korean Patent Application No. 10-2019-7028221 (dated Mar. 25, 2022).
Korean Intellectual Property Office, Notice of Preliminary Rejection in Korean Patent Application No. 10-2019-7028221 (dated Sep. 9, 2021).
European Patent Office, Communication Pursuant to Article 94(3) EPC in European Patent Application No. 16767027.2 (dated Nov. 19, 2021).
Taiwan Intellectual Property Office, Rejection Decision in Taiwanese Patent Application No. 105143160 (dated Oct. 1, 2021).
Chinese Patent Office, Reexamination Notification in Chinese Patent Application No. 201680076574.4 (dated Jun. 24, 2022).
U.S. Appl. No. 15/756,909, filed Mar. 1, 2018, Patented.
U.S. Appl. No. 16/066,212, filed Jun. 26, 2018, Patented.
U.S. Appl. No. 16/066,232, filed Jun. 26, 2018, Patented.
U.S. Appl. No. 16/089,693, filed Sep. 28, 2018, Patented.
U.S. Appl. No. 16/490,307, filed Aug. 30, 2019, Patented.
U.S. Appl. No. 17/162,351, filed Jan. 29, 2021, Patented.

* cited by examiner

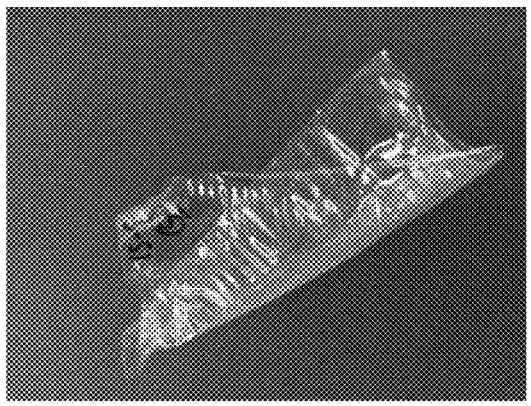
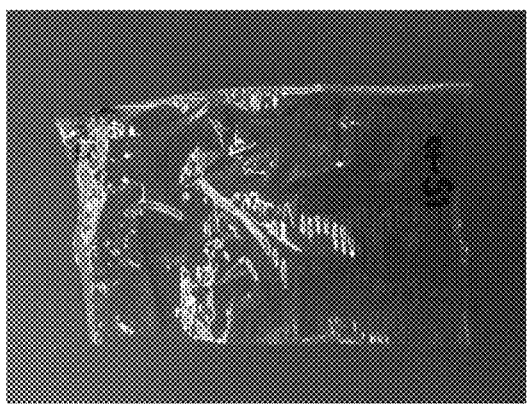
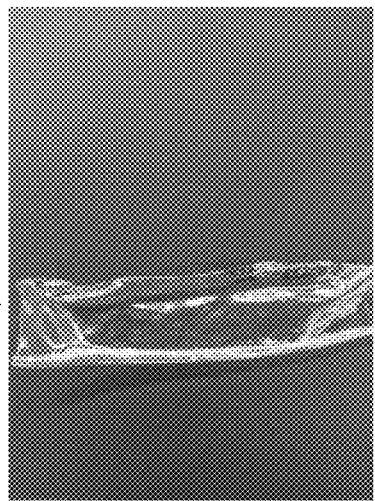
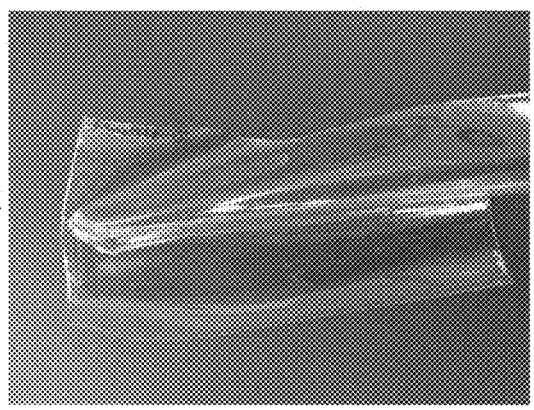

METHOD FOR PRODUCING POLYESTER FILM HAVING FURANDICARBOXYLATE UNIT

CROSS-REFERENCE TO RELATED APPLICATIONS

This patent application is the U.S. national phase of International Patent Application No. PCT/JP2018/007404, filed Feb. 28, 2018, which claims the benefit of International Patent Application No. PCT/JP2017/008200, filed on Mar. 1, 2017, which are incorporated by reference in their entireties herein.

TECHNICAL FIELD

The present invention relates to a method for producing a biaxially oriented polyester film having a furandicarboxylate unit.

BACKGROUND ART

Polyester resins such as polyethylene terephthalate (PET) and polybutylene terephthalate (PBT), which are thermoplastic resins excellent in heat resistance and mechanical properties, have been used in a very wide variety of fields such as plastic films, electronics, energy, packaging materials, and automobiles. Among plastic films, biaxially stretched PET films have been used widely for industrial and packaging fields because of their excellent balance between cost and mechanical characteristic strength, heat resistance, dimensional stability, chemical resistance, optical characteristics, etc.

In the field of industrial films, biaxially stretched PET films can be used as functional films for flat panel displays (FPD) such as liquid crystal displays and plasma displays because of their excellent transparency. Furthermore, PET films to which hydrolysis resistance is imparted have been used as films for solar cell back sheets and also used for various purposes as functional films and base films.

In the field of packaging films, biaxially stretched PET films have been used for applications such as foodstuff packaging, shrink labels for bottles, and gas barrier films. Especially, films excellent in gas barrier properties have been used as packaging materials required to have airtightness for foodstuff, pharmaceutical products, electronic parts, and so on, or as gas shielding materials, and. there has been a growing demand for such films in recent years.

On the other hand, resins having biodegradability and resins produced from biomass-derived raw materials have drawn attention as environmentally friendly-type or environmentally sustainable-type materials. From the above-mentioned viewpoint, many investigations have been carried out for the purpose of providing renewable polymers for replacing petroleum derivatives such as PET. Furandicarboxylic acids (FDCAs) have been proposed as compounds being similar in chemical natures such as solubility in hot water and stability against acidic reagents, to terephthalic acid, which forms the backbone of PET and has a planar structure. Specifically, there have been proposed furan-based materials resulting from polycondensation of FDCAs with diols (Patent Document 1 and Non-Patent Document 1).

The only physical property of these polymers disclosed is their melting point and their mechanical strength is not specified. Therefore, it has been unclear whether or not thermoplastic resin compositions having a furandicarboxylate unit can be used in the fields of industrial and packaging films.

Regarding thermoplastic resin compositions having several types of furandicarboxylate units, typified by polybutylene furandicarboxylate (PBF), polymer compounds having a specified degree of polymerization and being usable for such applications as electric and electronic parts have been proposed (Patent Document 2). Furthermore, polyesters having specified reduced viscosity and terminal acid values and being excellent in mechanical strength have been proposed (Patent Documents 3 and 4).

However, the hot press-molded products of PBF disclosed in Patent Document 2 have low transparency and therefore are limited for use in the fields of industrial and packaging films. Regarding the mechanical. properties of 200 μm-thick sheet products having a polyethylene furandicarboxylate (PEF) structure disclosed in Patent Documents 3 and 4, both breaking elongation and breaking strength are low and it was inconceivable to use such sheet products in the fields of industrial and packaging films.

Uniaxially stretched films produced from sheets obtained from PEF derivatives or blends of PEF derivatives and copolymerized polyesters or the like have been investigated (Patent Documents 5 and 6).

Patent Document 5 discloses that as compared with a sheet made of a thermoplastic resin composition having a furandicarboxylate unit, a film obtained by uniaxially stretching the sheet at a ratio of 5 to 16 times has improved breaking elongation, depending on the kinds of the materials blended and the blending ratio. However, no significant improvement in breaking elongation is confirmed unless cyclohexanedimethanol-copolymerized PET, which is widely known to improve breaking elongation, is blended. It must be said that the effect derived from the blending ratio is limited and such films have not been used so far in the fields of industrial and packaging films.

Patent Document 6 discloses a PEF film uniaxially stretched about 1.6 times by using rolling rolls. Although the disclosed film is a plastic film excellent in gas barrier properties, this merely indicates the advantages of barrier properties derived from the chemical structure of PEF. Its mechanical strength, which is important for packaging materials, is not made clear, so that the film has not been used so far in the field of gas barrier film for packaging having a furandicarboxylate unit.

In Patent Document 7, only the improvement in the characteristics of a biaxially stretched polyester film containing a furandicarboxylic acid and a film having a heat-sealability has been investigated.

PRIOR ART DOCUMENTS

Patent Documents

Patent Document 1: U.S. Pat. No. 2,551,731
Patent Document 2: Japanese Patent No. 4881127
Patent Document 3: JP-A-2013-155389
Patent Document 4: JP-A-2015-098612
Patent Document 5: JP-T-2015-506389
Patent Document 6: JP-A-2012-229395
Patent Document 7: WO 2016/032330
Non-Patent Document 1: Y. Hachihama, T. Shono, and K. Hyono, Technol. Repts. Osaka Univ., 8, 475 (1958)

SUMMARY OF THE INVENTION

Problems to be Solved by the Invention

Currently, the resin compositions having furandicarboxylate units proposed in the above-mentioned Patent Documents are under investigation as substitutions for PET. However, the resin compositions cannot be used. for industrial and packaging films because of their inferior mechanical characteristics. Further, no investigation is carried out on the heat resistance and transparency of the resin compositions, so that their applicability in the fields of industrial and packaging films is unclear.

It is an object of the present invention to provide a method for producing a polyester film having a furandicarboxylate unit in its main chain and having excellent mechanical properties.

Solutions to the Problems

That is, the present invention is (1) A method for producing a biaxially oriented polyester film, comprising:
a step of feeding a polyester resin. into an extruder,
a step of extruding the molten polyester resin from an extruder to obtain a molten resin sheet at 250 to 310° C.,
a step of attaching the molten resin sheet closely to a cooling roll by an electrostatic application method to obtain an unstretched sheet, and
a step of biaxially stretching the unstretched sheet,
wherein the polyester resin fulfills the following (A) to (C):
(A) the polyester resin comprises a polyethylene furandicarboxylate resin composed of a furandicarboxylic acid and ethylene glycol;
(B) an intrinsic viscosity of the polyester resin is 0.50 dL/g or more;
(C) a melt specific resistance value at 250° C. of the polyester resin is $3.0 \times 10^7$ Ω·cm or less.

(2) Preferably, a melt specific resistance value of the molten resin sheet at the above temperature is $2.5 \times 10^7$ Ω·cm or less.

(3) Preferably, the melt specific resistance value of the polyester resin at 275° C. is $2.5 \times 10^7$ Ω·cm or less.

(4) Preferably, the step of obtaining an unstretched sheet and the step of biaxially stretching the unstretched sheet are carried out continuously.

(5) Preferably, a plane orientation coefficient $\Delta P$ of the film is 0.005 or more and 0.200 or less and a thickness of the film is 1 μm or more and 300 μm or less.

(6) Preferably, the polyester film has a heat shrinkage rate of 0.01% or more and 50% or less when the polyester film is heated at 150° C. for 30 minutes.

(7) Preferably, the film has an oxygen transmission of 1 mL/m²/day/MPa or more and 200 mL/m²/day/MPa or less per 50 μm of film thickness at a temperature of 23° C. and a relative humidity of 65%.

(8) Preferably, both a refractive index (nx) of the film in a flow direction in the film plane and a refractive index (ny) of the film in a transverse direction perpendicular to the flow direction in the film plane are 1.5700 or more and 1.7000 or less.

Effects of the Invention

Polyester films having a furandicarboxylate unit obtained by the production method of the present invention can be used suitably as industrial and packaging films because the films are excellent in mechanical properties. According to preferred embodiments, polyester films having a furandicarboxylate unit obtained by the production method of the present invention surprisingly have strength and heat stability comparable to those of PET film and have gas shielding property extremely higher than that of PET film. The films can therefore provide packaging materials required to have air-tightness for foodstuff, pharmaceutical products, electronic parts, and so on, or gas shielding materials.

BRIEF DESCRIPTION OF THE DRAWING

FIG. 1 includes photographs of the films of Examples 1, 4 and 6 and Reference Examples 1 and 2 after a heat resistance test.

MODE FOR CARRYING OUT THE INVENTION

The production method of the present invention includes a step of feeding a polyester resin into an extruder, a step of extruding the molten polyester film from an extruder to obtain a molten resin sheet at 250 to 310° C., a step of attaching the molten resin sheet closely to a cooling roll by an electrostatic application method to obtain an unstretched sheet, and a step of biaxially stretching the unstretched sheet.

Polyester films obtained by the production method of the present invention, which may hereinafter be referred to as polyester films of the present invention, are produced by using a polyester resin.

The polyester resin mentioned above includes a polyethylene furandicarboxylate resin, which may hereinafter be referred to as PEF, composed of a furandicarboxylic acid and ethylene glycol. That is, the polyethylene furandicarboxylate resin is formed of a composition composed. of a dicarboxylic acid component (furandicarboxylic acid) and a glycol component (ethylene glycol). The content of ethylene furandicarboxylate units in 100 mol % of all constituent units of the polyester is preferably more than 50 mol % and 100 mol % or less. The polyester may be a polyethylene furandicarboxylate-based resin in which other dicarboxylic acid component or glycol component is copolymerized to a degree that does not hinder the object of the present invention. The content of ethylene furandicarboxylate units is more preferably 70 mol % or more and 100 mol % or less, even more preferably 80 mol % or more and 100 mol % or less, further even more preferably 90 mol % or more and 100 mol % or less, particularly preferably 95 mol % or more and 100 mol % or less, and most preferably 100 mol %.

The amount of the other dicarboxylic acid components and that of the glycol components to be copolymerized are preferably 20 mol % or less, more preferably 10 mol % or less, and particularly preferably 5 mol % or less in 100 mol % of all constituent units of the polyester.

Examples of the other dicarboxylic acid components include aromatic dicarboxylic acids such as terephthalic acid, isophthalic acid, phthalic acid, naphthalene dicarboxylic acid, 4,4'-dicarboxybiphenyl, and sodium 5-sulfoisophthalate; alicyclic dicarboxylic acids such as 1,4-cyclohexanedicarboxylic acid, 1,3-cyclohexanedicarboxylic acid, 1,2-cyclohexanedicarboxylic acid, 2,5-norbornenedicarboxylic acid, and tetrahydrophthalic acid; and aliphatic dicarboxylic acids such as oxalic acid, malonic acid, succinic acid, adipic acid, azelaic acid, sebacic acid, undecanedioic acid, dodecanedioic acid, octadecanedioic acid, furnaric acid, maleic acid, itaconic acid, mesaconic acid, citraconic acid, and dimer acid; and the like.

Examples of the other glycol components include aliphatic glycols such as 1,2-propanediol, 1,3-propanediol, 1,2-butanedial, 1,3-butanediol, 1,4-butanediol, 2-methyl-1, 3-propanediol, 2-amino-2-ethyl-1,3-propanediol, 2-amino-2-methyl-1,3-propanediol, 1,10-decanediol, dimethyloltricydodecane, diethylene glycol, and triethylene glycol; ethylene oxide adducts or propylene oxide adducts of bisphenol A, bisphenol S, bisphenol C, bisphenol Z, bisphenol AP, and 4,4'-biphenol; alicyclic glycols such as 1,2-cyclohexanedimethanol, 1,3-cyclohexanedimethanol, and 1,4-cyclohexanedimethanol; polyethylene glycol; polypropylene glycol; and the like.

A polymerization method for such a polyethylene furandicarboxylate-based. resin can employ any optional production method such as a direct polymerization method in which a furandicarboxylic acid, ethylene glycol and, if necessary, other dicarboxylic acid components and diol components are reacted directly, and an transesterification method in which a dimethyl ester of a furandicarboxylic acid (including dimethyl esters of other dicarboxylic acids, if necessary) and ethylene glycol (including other diol components, if necessary) are subject to a transesterification reaction.

The polyester film of the present invention may contain other resins such as polyamide, polystyrene, polyolefin, and polyester other than those described above as components. The content of the other resins is preferably 30 mol % or less, more preferably 20 mol % or less, even more preferably 10 mol % or less, and further even more preferably 5 mol % or less, and most preferably 0 mol %, relative to all constituent units of the polyester film. In the present description, a film containing a resin other than polyesters is also called "polyester film."

<Polyester Resin>

The intrinsic viscosity of the polyester resin used in the present invention is preferably in a range of 0.50 dL/g or more and 1.20 dL/g or less, more preferably 0.50 dL/g or more and 1.00 dL/g or less, even more preferably 0.60 L/g or more and 0.95 dL/g or less, and most preferably 0.70 dL/g or more and 0.95 dL/g or less. The intrinsic viscosity of less than 0.50 dL/g makes an obtained film easily tear. The intrinsic viscosity of more than 1.20 dL/g increases the filtration pressure and makes high precision filtration difficult to be performed, thus causing difficulty in performing resin extrusion through a filter. The intrinsic viscosity of more than 1.20 dl/g saturates the improving effect on mechanical characteristics.

The polyester resin used in the present invention has the melt specific resistance value at 250° C. of $3.0 \times 10^7$ Ω·cm or less, preferably $2.7 \times 10^7$ Ω·cm or less, more preferably $2.5 \times 10^7$ Ω·cm or less, and even more preferably $2.4 \times 10^7$ Ω·cm or less. The polyester resin having the melt specific resistance value at 250° C. of $3.0 \times 10^7$ Ω·cm or less can enhance the stability when the molten polyester resin is extruded from an extruder, thus being able to increase the film formation speed. The lower limit of the melt specific resistance value at 250° C. is not limited, but is $0.1 \times 10^7$ Ω·cm or more, for example.

The polyester resin used in the present invention has the melt specific resistance value at 275° C. of preferably $2.5 \times 10^7$ Ω·cm or less, more preferably $2.2 \times 10^7$ Ω·cm or less, even more preferably $2.0 \times 10^7$ Ω·cm or less, and particularly preferably $1.5 \times 10^7$ Ω·cm or less. The polyester resin having the melt specific resistance value at 275° C. of $2.5 \times 10^7$ Ω·cm or less can enhance the stability when the molten polyester resin is extruded from an extruder, thus being able to increase the film formation speed. The lower limit of the melt specific resistance value at 275° C. is not limited, but is $0.05 \times 10^7$ Ω·cm or more. for example.

<Molten Resin Sheet>

The intrinsic viscosity of the molten resin sheet used in the present invention is preferably in a range of 0.30 dL/g or more and 1.20 dL/g or less, more preferably 0.50 dL/g or more and 1.00 dL/g or less, even more preferably 0.60 dL/g or more and 0.95 dL/g or less, and most preferably 0.70 dL/g or more and 0.95 dL/g or less. The intrinsic viscosity of less than 0.30 dL/g makes an obtained film easily tear. The intrinsic viscosity of more than 1.20 dL/g increases the filtration pressure and makes high precision filtration difficult to be performed, thus causing difficulty in performing resin extrusion through a filter. The intrinsic viscosity of more than 1.20 dl/g saturates the improving effect on mechanical characteristics.

The molten resin sheet used in the present invention has the melt specific resistance value at 250° C. of $3.0 \times 10^7$ Ω·cm or less, preferably $2.7 \times 10^7$ Ω·cm or less, more preferably $2.5 \times 10^7$ Ω·cm or less, and even more preferably $2.4 \times 10^7$ Ω·cm or less. The lower limit of the melt specific resistance value at 250° C. is not limited, but is $0.1 \times 10^7$ Ω·cm or more, for example.

The melt specific resistance value at a temperature at which the molten resin sheet used in the present invention is extruded from an extruder is preferably $2.5 \times 10^7$ Ω·cm or less, more preferably $2.2 \times 10^7$ Ω·cm or less, even more preferably $2.0 \times 10^7$ Ω·cm or less, and most preferably $1.5 \times 10^7$ Ω·cm or less. The lower limit of the melt specific resistance value at a temperature at which the molten resin sheet is extruded from an extruder is not limited, but is $0.05 \times 10^7$ Ω·cm or more, for example.

<Polyester Film>

The polyester film of the present invention preferably has a plane orientation coefficient (ΔP) of 0.005 or more and 0.200 or less, more preferably 0.020 or more and 0.195 or less, even more preferably 0.100 or more and 0.195 or less, further even more preferably 0.120 or more and 0.195 or less, particularly preferably 0.140 or more and 0.190 or less, and most preferably 0.140 or more and 0.160 or less.

The plane orientation coefficient (ΔP) of less than 0.005 leads to insufficient mechanical characteristics of the film. These insufficient mechanical characteristics might cause difficulty in performing post-processing such as printing on the film and bag production from the film and might cause the film to be cut on a printer or a coater upon post-printing or post-coating. ΔP of 0.160 or less yields sufficient mechanical strength of the film. The plane orientation coefficient can be calculated as follows. The refractive index (nx) in the machine direction (MD direction) of the film plane, the refractive index (ny) in the direction (transverse direction (TD direction)) perpendicular to MD direction, and the refractive index (nz) in the thickness direction are measured in accordance with JIS K 7142-1996 5.1 (method A) with an Abbe refractometer in which a light source is a sodium D line. The plane orientation coefficient (ΔP) can be calculated based on the following equation:

$$\Delta P = \{(nx+ny) \cdot 2nz\} \div 2$$

The intrinsic viscosity of the polyester film of the present invention is preferably 0.30 dl/g or more and 1.20 dl/g or less, more preferably 0.55 dl/g or more and 1.00 dl/g or less, and even more preferably 0.70 dl/g or more and 0.95 dl/g or less. The intrinsic viscosity of less than 0.30 dL/g makes an obtained film easily tear. The intrinsic viscosity is more than 1.20 dl/g saturates the improving effect on mechanical characteristics.

The polyester film of the present invention preferably has a heat shrinkage rate of 50% or less, more preferably 30% or less, even more preferably 20% or less, further even more preferably 10% or less, particularly preferably 8% or less, and most preferably 4.5% or less in both MD direction and TD direction when heated at 150° C. for 30 minutes. A high heat shrinkage rate causes difficulty in performing printing or coating due to the occurrence of color deviation at the time of printing, and the occurrence of elongation of the film on a printer and a coater, and causes poor appearance due to deformation of the film by high temperature heating. A low heat shrinkage rate is preferable, but the lower limit of the heat shrinkage rate is considered to be 0.01% in terms of production.

In the present invention, the oxygen transmission per 50 μm of film thickness at a temperature of 23° C. and a humidity of 65% is preferably 1 mL/m$^2$/day/MPa or more and 200 mL/m$^2$/day/MPa or less, more preferably 50 mL/m$^2$/day/MPa or less, even more preferably 40 mL/m$^2$/day/MPa or less, and further even more preferably 30 mL/m$^2$/day/MPa or less. The oxygen transmission exceeding 200 mL/m$^2$/day/MPa may worsen preservation properties for materials and foodstuff prone to be deteriorated by oxygen. The lower limit of the oxygen transmission is considered to be 1 mL/m$^2$/day/MPa in terms of production.

In the present invention, the oxygen transmission of the film at a temperature of 23° C. and a humidity of 65% is preferably 1 mL/m$^2$/day/MPa or more and 1000 mL/m$^2$/day/MPa or less, more preferably 500 mL/m$^2$/day/MPa or less, even more preferably 200 mL/m$^2$/day/MPa or less, and further even more preferably 120 mL/m$^2$/day/MPa or less. The oxygen transmission exceeding 1000 mL/m$^2$/day/MPa may worsen preservation properties for materials and foodstuff prone to be deteriorated by oxygen. The lower limit of the oxygen transmission is considered to be 1 mL/m$^2$/day/MPa in terms of production.

The oxygen transmission disclosed herein is the oxygen transmission of a film itself, and naturally, it is possible to improve the oxygen permeability by subjecting the film to coating, metal vapor deposition, metal oxide vapor deposition, sputtering, co-extrusion and so on.

In the present invention, the oxygen transmission per 50 μm of film thickness at a temperature of 37.8° C. and a humidity of 90% RH is preferably 0.1 g/m$^2$/day or more and 10 g/m$^2$/day or less, more preferably 8 g/m$^2$/day or less, and even more preferably 5 g/m$^2$/day or less. The oxygen transmission exceeding 10 g/m$^2$/day may worsen preservation properties for materials and foodstuff prone to be deteriorated by water vapor that has permeated the film. The lower limit of the oxygen permeability is considered to be 0.1 g/m$^2$/day in terms of production.

In the present invention, the water vapor transmission of film at a temperature of 37.8° C. and a humidity of 90% RH is preferably 0.1 g/m$^2$/day or more and 40 g/m$^2$/day or less, more preferably 30 g/m$^2$/day or less, and even more preferably 20 g/m$^2$/day or less. If the water vapor transmission exceeds 40 g/m$^2$/day, preservation properties for materials and foodstuff prone to be deteriorated by water vapor that has permeated the film may become poor. In terms of production, the lower limit of the oxygen permeability is conceivable to be 0.1 g/m$^2$/day.

In the film of the present invention, the polyester film having a furandicarboxylate unit itself has a high oxygen barrier property (that is, low oxygen transmission), but the oxygen barrier property can be further enhanced by performing a stretching step described below.

The refractive index (nx) in MD direction of the film plane and the refractive index (ny) in the direction perpendicular to MD direction are preferably 1.5700 or more, more preferably 1.5800 or more, even more preferably 1.5900 or more, further even more preferably 1.6000 or more, particularly preferably 1.6100 or more, and most preferably 1.6200 or more. Both nx and ny are preferably 1.5700 or more for the following reasons. Such values of nx and ny yield sufficient breaking strength and breaking elongation of the film, thus achieving satisfactory mechanical properties of the film. These satisfactory mechanical properties facilitate postprocessing such as printing on the film and bag production from the film, and makes the film less likely to be cut on a printer or a coater upon post printing or post coating. The upper limit of the refractive indexes is preferably 1.7000 or less in terms of production and heat shrinkage rate.

The polyester film of the present invention preferably has a breaking strength of 75 MPa or more in both MD direction and TD direction. The lower limit of the breaking strength is preferably 100 MPa, more preferably 150 MPa, even more preferably 200 MPa, and further even more preferably 220 MPa. The breaking strength of less than 75 MPa is not preferable because it causes insufficient mechanical strength of the film and thus easily generates defects such as elongation and deviation in the film processing. In consideration of production, the upper limit is 1000 MPa.

The polyester film of the present invention preferably has a breaking elongation of 10% or more in both MD direction and TD direction. The lower limit of the breaking elongation is preferably 15%, more preferably 20%, and particularly preferably 30%. The breaking elongation of less than 10% is not preferable because it causes insufficient mechanical elongation of the film and thus easily generates defects such as cracking and tearing in the film processing. In consideration of production, the upper limit is 300%. The upper limit is preferably 150%, more preferably 100%, and even more preferably 80%.

The polyester film of the present invention preferably has a total light transmittance of 75% or more. High transparency is desirable in order to improve the precision in detection of internal foreign matter that, becomes a defect of the film. For this reason, the polyester film of the present invention preferably has a total light transmittance of 75% or more, more preferably 80% or more, even more preferably 88.5% or more, and particularly preferably 89% or more. The higher total light transmittance is better in order to improve the precision in detection of internal foreign matter that becomes a defect of the film. However, a total light transmittance of 100% is technically difficult to achieve.

The polyester film of the present invention preferably has a haze of 15% or less. Less opaque the film is desirable in order to inspect defects of contents in use for packaging foodstuff. For this reason, the polyester film of the present invention preferably has a haze of 15% or less, more preferably 8% or less, even more preferably 3% or less, and particularly preferably 1% or less. A lower haze is preferred, but the lower limit of the haze is considered to be 0.1% in terms of the refractive index intrinsic to the polyester film having a furandicarboxylate unit.

The thickness of the film is preferably 1 μm or more and 300 μm or less, more preferably 5 μm or more and 200 μm or less, even more preferably 10 μm or more and 100 μm or less, and further more preferably 10 μm or more and 40 μm or less. The thickness exceeding 300 μm would. be problematic in terms of cost, and is likely to lower visibility when the film is used as a packaging material. On the other hand, the thickness of less than 1 μm lowers the mechanical characteristics and might fail to exhibit functions imparted to the film.

<Method for Producing Polyester Film>

The method for producing a polyester films of the present invention will hereafter be described.

As described above, the production method of the present invention includes a step of extruding a molten polyester film from an extruder to obtain a molten resin sheet at 250 to 310° C., a step of attaching the molten resin sheet closely to a cooling roll by an electrostatic application method to obtain an unstretched sheet, and a step of biaxially stretching the unstretched sheet.

[(A) Step of Extruding Molten Polyester Resin from Extruder to Obtain Molten Resin Sheet at 250 to 310° C.]

First, the polyester resin as a raw material is dried or hot-air dried to adjust the water content thereof to 100 ppm or less. Subsequently, a resin is weighed, mixed and fed to an extruder. The resin is then heated and melted at a temperature of 250 to 310° C., and melt-extruded into a sheet-like form, producing a molten resin sheet. Setting the extrusion temperature (the temperature of the molten resin sheet) to 250° C. or higher can sufficiently lower the melt viscosity at the time of extrusion. Sufficiently reducing the melt specific resistance value can improve the stability upon extrusion. These sufficiently lowered melt viscosity and improved stability can increase the film formation speed. The heating and melting temperature of higher than 310° C. deteriorates the resin, thus causing poor appearance of a resulting film. The heating and melting; temperature is preferably 300° C. or lower.

The temperature of a molten resin sheet is measured as follows. An extruded molten resin sheet (molten resin) is pierced with a sensor for semi-solid/liquid of a digital thermometer, and the temperature of the molten resin sheet is measured. In a common film formation machine, a molten resin sheet to be extruded has the same temperature as a tube or a T-die, so that the temperature of a tube is taken as the temperature of a molten resin sheet in Examples.

The extrusion temperature is preferably 35° C. or more higher than the melting point of the polyester resin, more preferably 45° C. or more higher than the inciting point of the polyester resin, and even more preferably 55° C. or more higher than the melting point of the polyester resin. Setting the extrusion temperature to 35° C. or more higher than the melting point of the polyester resin can sufficiently lower the melt viscosity upon extrusion. Sufficiently reducing the melt specific resistance value can improve the stability upon extrusion. These sufficiently lowered melt viscosity and improved stability can increase the film formation speed. Examples of the polyester resin include a PEF resin having a inciting point of 215° C. Upon use of a common polyethylene terephthalate (melting point: 255° C.), melt extrusion is performed at a temperature that is 20 to 30° C. higher than the melting point.

At an arbitrary site where the molten resin is kept at 250 to 310° C., high precision filtration is performed in order to remove a foreign matter contained in the resin. A filter medium used for the high precision filtration of the molten resin is not limited; however, a filter medium made of sintered stainless steel is suitable because it has excellent performance of removing agglomerates containing Si, Ti, Sb, Ge or Cu as main components and high melting point organic matters.

[(B) Step of Attaching Molten Resin Sheet Closely to Cooling Roll by Electrostatic Application Method to Obtain Unstretched Sheet]

The resin sheet in a molten state is closely attached to a cooling roll (rotary metal roll or casting roll) by an electrostatic application method and then is cooled and solidified to obtain an unstretched sheet. The electrostatic application method is to bring a charged resin sheet and a cooling roll into close contact with each other. The resin sheet is charged. by applying a voltage to an electrode disposed near the surface of the resin sheet that is opposite to the surface being in contact with the cooling roll. This voltage application is performed in the vicinity of where the resin sheet in a molten state touches the cooling roll. The electrostatic application is preferably performed under a condition of applying a voltage of 2 kV to 10 kV, and more preferably of 3 kV or more and of 15 kV or less.

The electrostatic application method is preferably performed by an. electrostatic addition method using electrodes, and two or more such methods may be employed in combination. The electrodes may be a wire-like electrode, a band-like electrode, a needle-like electrode or a combination thereof, but not particularly limited thereto.

The diameter of the wire-like electrode is preferably 0.01 mm or more and 1.0 mm or less, more preferably 0.03 mm or more and 0.5 mm or less, and particularly preferably 0.03 mm or more and 0.1 mm or less. Although a tension is applied to a wire-like electrode in order to prevent electrode movement due to resonance or mechanical vibration, a wire-like electrode having the diameter of smaller than 0.01 mm cannot withstand the tension and the wire nay be broken. The diameter of larger than 1.0 mm requires an excessively large voltage current in order to closely attach a molten resin sheet to a cooling roll efficiently and uniformly, thus making abnormal discharge prone to occur.

Examples of materials of the wire-like electrode include tungsten iron, nickel, cobalt, molybdenum, titanium, tantalum, aluminum, copper, and stainless steel, and alloys thereof may be used. In order to improve corrosion resistance and acid resistance, plating treatment with gold, platinum, or the like may be applied to the surface of the wire-like electrode.

A power supply transformer capable of generating a DC voltage of 1 kV or more and 20 kV or less is used as a power supply used for the present invention.

In the close attachment solidification of the molten resin of the present invention to a cooling roll by an electrostatic application method, the temperature of lower than. 250° C. of the molten resin sheet causes high melt specific resistance value of the resin sheet in a molten state and unstable close attachment solidification to the cooling roll by an electrostatic application method, thus failing to achieve an unstretched PEF sheet that is stable in appearance, thickness, and characteristics in the thickness direction, the longitudinal direction, or the transverse direction. These unstable properties cause a problem of being unable to stably perform the biaxial stretch carried out continuously.

As for PEF resin, the melt specific resistance value decreases as the temperature of the resin increases. In order to stably achieve close attachment to a cooling roll by an electrostatic application method, the temperature of a molten resin is preferably adjusted to 250° C. or higher, more preferably 260° C. or higher, and even more preferably 270°C. or higher. The temperature of the molten resin is preferably 310° C. or lower, and more preferably 300° C. or lower. Upon use of PEF resin, the lower melt specific resistance value achieves the lower intrinsic viscosity of the resin. The intrinsic viscosity of the resin is, however, 0.50 dl/g or more, without particular limitation thereto, if only biaxially oriented polyester films can be produced.

Upon layering a surface layer (a layer) and an intermediate layer (b layer) by co-extrusion, raw materials for the respective layers are melted by heating to a temperature of 250° C. or higher and extruded with two or more extruders. Both of the resultant layers are joined with a multilayer feed block (e.g., joining block having a rectangular joining part). The joined product is extruded into a sheet-like form from a slit-like T-die, and cooled and solidified on a cooling roll by an electrostatic application method to prepare a laminated polyester sheet. Alternatively; a multi-manifold die may be used in place of the multilayer feed block.

[(C) Step of Biaxially Stretching the Unstretched Sheet]

Next, the polyester sheet obtained in the above-described manner is biaxially stretched and successively subjected to a heat fixation treatment. It is preferable to continuously perform the step of obtaining an unstretched sheet and the step of biaxially stretching the unstretched sheet. "Continuously" means that the biaxially stretching step is performed successively without winding the unstretched sheet.

For example, production of a biaxially oriented polyester film having a furandicarboxylate unit can. employ a sequential biaxial stretching method in which uniaxial stretching is performed in MD direction or TD direction and then stretching is performed in the perpendicular direction; a simultaneous biaxial stretching method in which stretching is performed simultaneously in both MD direction and TD direction; and a method in which a linear motor is used as driving means at the time of simultaneous biaxial stretching. In the sequential biaxial stretching method, the MD stretching can be performed by making a speed difference with use of heating rolls, thereby stretching a sheet in MD direction. An infrared heater or the like may be used in combination for heating. The TD stretching to be carried out succesively can be performed by leading the MD stretched sheet to a tenter, holding both edges of the stretched sheet with clips, and stretching the sheet in TD direction while heating it. The film resulting after the TD stretching is contiguously subjected to a heat fixation treatment in the tenter. The heat fixation treatment may be performed while the film is kept stretched in TD direction, or may be performed while the film is allowed to relax in TD direction. The film resulting after the heat fixation treatment can be cut off at its both edges and then wound by a winder.

In order to attain high mechanical characteristics, a polyester film of the present invention is prepared preferably by performing the stretch/relaxation methods (1) through (7) described below.

(1) Control of Stretch Ratio in MD Direction of Film

Obtaining the polyester film of the present invention necessitates stretching in MD direction in a range of 1.1 to 10.0 times. A film having a plane orientation coefficient ΔP of 0.005 or more can be prepared by longitudinally stretching in MD direction at 1.1 times or more. The stretch ratio in MD direction is preferably 2.5 times or more, more preferably 3.5 times or more, even more preferably 4 times or more, and particularly preferably 4.5 times or more. By setting the stretch ratio in MD direction to 2.5 times or more, the ΔP is made to be 0.02 or more and the refractive indexes nx and ny in MD direction and TD direction are made to be 1.5700 or more. These values enable formation of a film excellent in dynamic characteristics having a film breaking strength of 100 MPa or more, and a film breaking elongation of 15% or more. The stretch ratio in MD direction of 10.0 times or less is preferable because such a ratio lowers the frequency of breaking the film.

(2) Control of Stretch Temperature in MD Direction of Film

Obtaining the polyester film of the present invention makes it desirable to perform stretching in MD direction in a range of 90° C. or higher and 150° C. or lower. The stretch temperature is more preferably 100° C. or higher and 125° C. or lower. The stretch temperature in MD direction of 90° C. or higher is preferable because such a temperature lowers the frequency of breaking the film. The stretch temperature of 150° C. or lower is preferable because such a temperature enables uniform stretching.

(3) Control of Stretch Ratio in TD Direction of Film

Obtaining the polyester film of the present invention makes it desirable to perform stretching in TD direction in a range of 1.1 to 10.0 times. A film having a plane orientation coefficient ΔP of 0.005 or more can be prepared by stretching in TD direction at 1.1 times or more. The stretch ratio in TD direction is preferably 3.0 times or more, more preferably 3.5 times or more, even more preferably 4 times or more, and particularly preferably 4.5 times or more. By setting the stretch ratio in TD direction to 3.0 times or more, the ΔP is made to be 0.02 or more and the refractive indexes nx and ny in MD direction and TD direction are made to be 1.5700 or more. These values enable formation of a film being excellent in dynamic characteristics that has a film breaking strength of 75 MPa or more and a film breaking elongation of 15% or more. The stretch ratio in TD direction of 10.0 times or less is preferable because such a ratio lowers the frequency of breaking the film.

(4) Control of Stretch Temperature in TD Direction

Obtaining the polyester film of the present invention makes it desirable to perform stretching in. TD direction in a range of 80° C. or higher and 200° C. or lower. The TD stretch temperature is more preferably 95° C. or higher and 135° C. or lower. The stretch temperature in TD direction of 80° C. or higher is preferable because such a temperature lowers the frequency of breaking the film. The stretch temperature of 200° C. or lower is preferable because such a temperature enables uniform stretching.

(5) Control of Heat Fixation Temperature of Film

Obtaining the polyester film of the present invention makes it desirable to perform a heat fixation treatment in a range of 110° C. or higher and 220° C. or lower. The temperature of 220° C. or lower, preferably 210° C.' or lower, for the heat fixation treatment is preferable because such a temperature makes the film hardly become opaque and lowers the frequency of melt breaking of the film. Increasing the heat fixation temperature lowers the heat shrinkage rate, thus being preferable. The heat fixation temperature is more preferably 120° C. or higher, even more preferably 140° C. or higher, further even more preferably 160° C. or higher, and particularly preferably 175° C. or higher. The plane orientation coefficient ΔP tends to be increased by the heat fixation treatment.

(6) Control of Relaxation Temperature in TD Direction

Obtaining the polyester film of the present invention makes it desirable to perform a relaxation treatment in TD direction in a range of 100°C. or higher and 200° C. or lower. The temperature is preferably 165° C. or higher and 195° C. or lower. Such a temperature is desirable because it can lower the heat shrinkage rate.

(7) Control of Relaxation Ratio in TD Direction

Obtaining the polyester film of the present invention makes it desirable to perform relaxation at a relaxation ratio in TD direction in a range of 0.5% or more and 10% or less.

The relaxation ratio is preferably 2% or more and 6% or less. Such a relaxation ratio is desirable because it can lower the heat shrinkage rate.

The polyester film of the present invention preferably includes a stretching step of stretching an unstretched film in the machine direction and in the direction perpendicular to the machine direction, thereby forming a stretched film, and a relaxation step of relaxing the stretched film, without limitation to the method specifically disclosed above. It is important for the production of the polyester film of the present invention that the production conditions described above are controlled precisely in the extremely narrow ranges based on the technical idea described above.

In the polyester film of the present invention, the stretching conditions and the heat fixation treatment conditions described above individually or in combination can control the breaking strength, breaking elongation, and heat shrinkage rate of the film. The conditions may be selected optionally, but preferable conditions combine the preferable conditions (1) to (7) described above in a manner that can form a film having a plane orientation coefficient (ΔP) of 0.140 or more, a heat shrinkage rate of 8% or less (preferably 4.5% or less), a film breaking strength of 150 MPa or more (preferably 250 MPa or more), and a film breaking elongation of 40% or more.

It is effective to increase the stretch ratio in MD direction and the stretch ratio in TD direction and perform the heat fixation treatment at a higher temperature in order to form a film having a heat shrinkage rate of 8% or less and breaking strength of 150 MPa or more. Specifically, it is effective to adjust the stretch ratio in MD direction to be 4 times or more (preferably 4.5 times or more), the stretch ratio in TD direction to be 4.0 times or more (preferably 4.5 times or more) and the temperature for the heat fixation treatment to be 165° C. or higher in order to form a film having a heat shrinkage rate of 8% or less and breaking strength of 150 MPa or more.

During the stretching step or after the completion of the stretching of the film, a corona treatment or a plasma treatment may be performed. It is also possible to impart slipping property, anti-blocking property, antistatic property, easy adhesive property, etc. by coating the film with a liquid in a solvent or a dispersion liquid prepared by mixing resins, crosslinking agents, particles, etc., appropriately. Various kinds of stabilizers, pigments, UV absorbers, etc. may be added to the film of the present invention.

Moreover, surface treatment of the film that has been subjected to stretching and a heat fixation treatment can improve the functions of the film. Examples of the surface treatment include printing, coating, metal vapor deposition, metal oxide vapor deposition, and sputtering treatment.

The film subjected to stretching and a heat fixation treatment or the film subjected to a surface treatment can be used for packaging bodies, labels, aesthetic sheets, etc. by being laminated to paper.

The present application claims benefit of the priority based on PCT/JP2017/008200 filed on Mar. 1, 2017. The disclosure of the specification of PCT/JP2017/008200 filed on Mar. 1, 2017 is incorporated herein by reference in its entirety.

EXAMPLES

Next, the effects of the present invention will be explained with reference to Examples and Comparative Examples. First, the methods for evaluating characteristic values used in the present invention will be described as follows.

(1) Breaking Strength and Breaking Elongation

Strip form samples of 140 mm length and 10 mm width were cut out from films with a single-edged razor, the length and width of the strip form samples corresponded to the MD direction and TD direction of the films. Subsequently, each strip form sample was pulled with an Autograph AG-IS (manufactured by Shimadzu Corporation). From the obtained load-strain curve, the breaking strength (MPa) and the breaking elongation (%) in the respective directions were determined.

The measurement was performed under conditions represented by an atmosphere of 25° C., a chuck distance of 40 mm, a crosshead speed of 100 mm/min, and a load cell of 1 kN. The measurement was repeated 5 times and the average value thereof was employed.

(2) Plane Orientation Coefficient (ΔP)

The plane orientation coefficient (ΔP) was calculated by the following method.

The refractive index (nx) in MD direction of the film plane, the refractive index (ny) in the direction perpendicular to MD direction, and the refractive index (nz) in the thickness direction were measured in accordance with JIS K 7142-1996 5.1 (method A) with an Abbe refractometer in which a light source was a sodium D line, and the plane orientation coefficient (ΔP) was calculated based on the following equation:

$$\Delta P = \{(nx+ny) - 2nz\} \div 2$$

(3) Total Light Transmittance and Haze

The measurement was carried out in accordance with JIS K 7136-2000 "Plastics: Method of Determining Haze of Transparent Materials". A turbidity meter NDH-5000 manufactured by Nippon Denshoku Industries Co., Ltd. was used as a measuring instrument.

(4) Heat Shrinkage Rate (Heat Shrinkage Rates in MD Direction and TD Direction)

A film was cut out in a size 10 mm width and 250 mm length with respect to the direction for the measurement and marked at 150 mm intervals. The intervals (A) between marks were measured under a constant tension of 5 gf. Subsequently, the film was put in an oven containing an atmosphere of 150° C. and subjected to a heating fixation treatment at 150±3° C. for 30 minutes under no load. Thereafter, the intervals (B) between marks were measured under a constant tension of 5 gf. The heat shrinkage rate was calculated based on the following equation:

$$\text{Heat shrinkage rate (\%)} = 100(A-B)/A$$

(5) Oxygen Transmission Rate

The oxygen transmission was measured. with an oxygen transmission instrument (OX-TRAN2/21, manufactured by MOCON Inc.) under conditions represented by a temperature of 23° C. and a humidity of 65% in accordance with JIS K 7126-2A method.

(6) Water Vapor Transmission Rate

The water vapor transmission was measured with a water vapor transmission instrument (PERMATRAN-W (registered trademark) 3/33, manufactured by MOCON Inc.) under conditions represented by a temperature of 37.8° C. and a humidity of 90% in accordance with JIS K 7129B method.

(7) Intrinsic Viscosity (IV)

A polyester resin was crushed and dried, and then was dissolved in a mixed solvent of p-chlorophenol and tetrachloroethane (75/25 in weight ratio). The flow time of each solution having a concentration of 0.4 g/dl and the flow time of the solvent alone were measured at 30° C. with an Ubbelohde viscometer. The intrinsic viscosity of the polyester resin was calculated from their time ratio according to the Huggins' expression under the assumption that the Huggins' constant was 0.38. Likewise, intrinsic viscosities were calculated for molten resin sheets and polyester films.

(8) Film Thickness

Four 5 cm-square samples were cut out from arbitrary 4 positions within a region from the center line to 0.3 W in TD direction of a film to be measured, where the width of the film was represented by W. The samples were subjected to thickness measurement at 5 points per sample (20 points in total) with a Millitron 1254 manufactured by Mahr. The average value thereof was taken as thickness.

(9) Test of Oxygen Permeability of Packaging Bag i) Preparation of Packaging Bag A polyester-based adhesive was applied to the laminated polyester films prepared in Examples or the polyester films prepared in Comparative Examples. Then, 40 µm-thick linear low density polyethylene films (LLDPE films, L4102 manufactured by Toyobo Co., Ltd.) were dry-laminated to the films. This dry-lamination was followed by aging at 40° C. for three days to form laminated films. Each of the laminated films was sealed on three sides to prepare packaging bags having an inner size 70 mm width and 105 mm length.

ii) Preparation of Coloring Solution

A glass container is loaded with 2 L of water and 6.6 g of powdered agar. The container was put in hot water at 95° C. and heated for 1 hour or more to completely dissolve the agar. The solution was filtered with a 50-mesh metal net to remove gelled foreign matters. The solution is mixed with 0.04 g of methylene blue. The solution was evenly mixed with 1.25 g of sodium hydrosulfide in a glove box in which nitrogen had previously been flowed through for 15 minutes or more to obtain a coloring solution (uncolored).

iii) Charge with Coloring Solution

The three-side-sealed bag was charged with about 30 mL of the coloring solution in the glove box in which nitrogen had previously been flowed through for 15 minutes or more. The three-side-sealed bag was filled with nitrogen and then sealed with a sealer to obtain a packaging bag filled with the coloring solution (packaging bag containing methylene blue coloring solution).

iv) Oxygen Permeability Test

The agar was solidified at room temperature, and then the packaging bag containing the methylene blue coloring solution was transferred to a thermostatic chamber at 40° C. and 90% RH, and color change was observed after 72 hours. The color change was judged according to the following criteria, and the following "A" was regarded as acceptable.

A: Almost no color change was observed.

B: Color change was observed, but it was slight.

(10) Test of Heat Resistance of Film

A film sample cut in a size 100 mm length and 100 mm width is prepared. The film sample is put in an oven heated to 130° C. and left for 5 minutes. Then, change in its appearance is observed. The change in appearance was judged according the following criteria, and the following "A", "B", and "C" were regarded as acceptable. Photographs of the films of Example 1, 4, and 6 and Reference Examples 1 and 2 after a heat resistance test are shown in FIG. 1.

A: Almost no change in appearance was observed.

B: Generally equivalent to the level of the above "A", but deformation was observed only in film edges.

C: A little change in appearance was observed.

D: Significant change in appearance was observed.

(11) Melt Specific Resistance Value

The melt specific resistance value of a molten resin sheet was measured by the following method. A pair of electrode plates were inserted into a sample (raw material pellet (polyester resin), molten resin sheet, or polyester film) melted at a prescribed temperature, and then a voltage of 120 V was applied. A current at this time was measured, and a melt specific resistance value Si (Ω·cm) was calculated on the basis of the following equation:

$$Si=(A/I)\times(V/io)$$

where A is the area of the electrodes (cm$^2$), I is the distance between the electrodes (cm), V is the voltage (V), and io is the current (A).

(12) Stability of Casting Step

It was judged b the method described below whether the close attachment of a molten resin sheet to a cooling roll by an electrostatic application method had been stable.

The stability of a casting step that was represented by surging of close attachment points or resin film edges, which occurred upon closely attaching the molten resin sheet to the cooling roll by an electrostatic application method, was judged according to the following criteria "A", "B" and "C", with "A" considered as acceptable.

A: The close attachment points were stable, and no surging of resin film edges was observed, and the appearance of the unstretched sheet obtained was good.

B: The close attachment points were stable, but surging of resin film edges was 5 mm or more.

C: The close attachment points were unstable, and surging of resin film edges was 5 mm or more.

The close attachment point is a point at which a molten resin film extruded from a T-die comes into contact with a cooling roll. "Stable" means that the surging of close attachment points is 2 mm or less. The surging of resin film edges is the variation in the width direction of the edges of the molten resin film extruded from a T-die.

(13) Temperature of Molten Resin Sheet

A molten resin sheet (molten resin extruded from a T-die outlet) was pierced with a sensor for semi-solid/liquid of a digital thermometer, and the temperature of the molten resin sheet was measured.

EXAMPLE 1

A raw material was polyethylene-2,5-furandicarboxylate manufactured by Avantium and having an intrinsic viscosity of 0.90 dL/g, a melting point of 215° C., and a melt specific resistance value of $1.1\times10^7$ Ω·cm. when heated and melted at 275° C. The raw material was dried under reduced pressure (1 Torr) at 100° C. for 24 hours to decrease its water content to 100 ppm or less, and then was fed to a twin screw extruder (screw diameter: 30 mm, L/D=25). The raw material fed to the twin screw extruder was melted and extruded into a sheet-like form through a T-die (a metal cap) while the resin temperature was kept at 270° C. from the melting part to the gear pump through the kneading part and the polymer tube (tube for melted raw material) of the extruder and kept at 275° C. in the subsequent polymer tube (tube for melted raw material). The temperature of the extruded molten resin sheet was 275° C.

The resin extruded was cast on a cooling drum having a surface temperature of 20° C., closely attached to the surface of the cooling drum by an electrostatic application method, and thereby cooled and solidified to prepare an unstretched film having a thickness of 250 µm. The electrostatic application method is to bring a charged resin sheet and a cooling roll (rotary metal roll, casting roll) into close contact with each other. The resin sheet is charged by applying a voltage to an electrode disposed near the surface of the resin sheet that is opposite to the surface being in contact with the cooling roll. This voltage application is performed in the vicinity of where the resin sheet in a molten state touches the cooling roll. The electrostatic application was carried out with KHD-15K01PN manufactured by Kasuga Electric Works, Ltd. under conditions where a voltage of 5 kV was applied to a tungsten wire electrode having a diameter of 0.05 mm. Upon closely attaching the molten resin sheet to a cooling roll by the electrostatic application method, the close attached point was stable and no surging of a resin film edge was observed. As a result, the appearance of the resulting unstretched. sheet was good.

The obtained unstretched sheet was heated by a group of rolls each heated to 120° C. to increase a film temperature thereof. Thereafter, the heated sheet was stretched in MD direction at 5.0 times by a group of rolls differing in peripheral speed to obtain a uniaxially stretched film.

Subsequently, the obtained uniaxially stretched film was led to a tenter, held with clips, and then subjected to transverse stretching. The conveying speed was set to 5 m/min. The TD stretching temperature was set to 105° C., and the TD stretch ratio was set to 5.0 times. Subsequently, the film was subjected to a heat fixation treatment at 200° C. for 12 seconds, and then subjected to a 5% relaxation treatment at 190° C. to obtain a polyester film having a furandicarboxylate unit. The physical properties of the obtained film are shown in Table 1.

EXAMPLE 2

A film was obtained M the same manner as in Example 1 except that the thickness of the unstretched film was set to 300 μm. The physical properties of the obtained film are shown in Table 1.

EXAMPLES 3 to 6

Films were obtained in the same manner as in Example 1 except that the conditions for film formation were changed as shown in Table 1. The physical properties of the obtained film are shown in Table 1.

EXAMPLE 7

A film was obtained in the same manner as in Example 1 except that the raw material to be used was changed to a resin having an intrinsic viscosity of 0.75 dL/g and a melting point of 215° C. that was prepared by dry blending polyethylene-2,5-furandicarboxylate having an intrinsic viscosity of 0.80 dl/g and a melting point of 215° C. manufactured by Avantium and polyethylene-2,5-furandicarboxylate having an intrinsic viscosity of 0.70 dL/g and a melting point of 215° C. manufactured by Avantium in a ratio of 50:50 and that the conditions for film formation were changed as shown in Table 1. The physical properties of the obtained film are shown in Table 1.

EXAMPLE 8

A film was obtained in the same manner as in Example 1 except that the conditions for film formation were changed as shown in Table 1. The physical properties of the film obtained are shown in Table 1.

COMPARATIVE EXAMPLE 1

(1) Production of PET Resin (A)

An esterification reactor was heated, and at the time when the temperature was reached 200° C., the reactor was charged with a slurry containing 86.4 parts by mass of terephthalic acid and 64.4 parts by mass of ethylene glycol. To the reactor were then added 0.017 parts by mass of antimony trioxide as a catalyst and 0.16 parts by mass of trimethylamine under stirring. Subsequently, the temperature was raised under pressure and an esterification reaction under pressure was performed under the conditions represented by a gauge pressure of 3.5 kgf/cm$^2$ and a temperature of 240° C. Thereafter, the inside pressure of the esterification reactor was returned to normal pressure, and 0.071 parts by mass of magnesium acetate tetrahydrate and successively 0.014 parts by mass of trimethyl phosphate were added. The reactor was further heated to 260° C. over 15 minutes, and 0.012 parts by mass of trimethyl phosphate and successively 0.0036 parts by mass of sodium acetate were added. After 15 minutes, the obtained esterification reaction product was transferred to a polycondensation reactor, gradually heated from 260° C. to 280° C. under reduced pressure, and then subjected to a polycondensation reaction at 285° C.

After the completion of the polycondensation reaction, the reaction product was filtered by a nylon filter having a 95% cut diameter of 5 μm, extruded from a nozzle in a strand-like form, cooled and solidified with cooling water which had previously been subjected to a filter treatment (pore diameter: 1 μm or less), and cut into pellets. The obtained PET resin (A) had a inciting point of 257° C. and an intrinsic viscosity of 0.62 dL/g, and the PET resin (A) contained substantially no inactive particles and no internally-deposited particles.

(2) Production of PET Resin (B)

Polyethylene terephthalate containing 2000 ppm of silica particles (Sylysia 310, average particle diameter of 2.7 μm, manufactured by Fuji Silysia Chemical Ltd.) as an additive was prepared in the same production manner as that for the PET (A) resin.

(3) Production of Biaxially Stretched Polyethylene Terephthalate Film

As raw materials for a surface layer (a), 70 parts by mass of pellets of the PET resin (A) and 30 parts by mass of pellets of the PET resin (B) were mixed and dried under reduced pressure (1 Torr) at 135° C. for 6 hours, and thereafter fed to an extruder 1. Moreover, as raw materials for an intermediate layer (b), 82 parts by mass of pellets of the PET resin (A) and 18 parts by mass of pellets of the PET resin (B) were mixed and dried under reduced pressure (1 Torr) at 135° C. for 6 hours, and thereafter fed to an extruder 2. The respective raw materials supplied to the extruder 2 and the extruder 1 were laminated in a manner of forming a/b/a with a 3-layer joining block and then melt-extruded out of a metal cap in a sheet-like form while the resin temperature was kept at 280° C. from the melting part to the filter through the kneading part, the polymer tube and the gear pump of the extruder and kept at 275° C. in the subsequent polymer tube. The thickness ratio of the a layer and the b layer was controlled with the gear pumps for the respective layers in a manner that the ratio of a/b/a become 8/84/8. A filter medium made of sintered stainless steel (nominal filtration precision: 10 μm particles are cut in a proportion of 95%) was used for all of the filters. The temperature of the metal cap was controlled in a manner that the temperature of the extruded resin is adjusted to 275° C.

The extruded resin was cast on a cooling drum having a surface temperature of 30° C., closely attached to the surface of the cooling drum by an electrostatic application method and thus solidified with cooling to prepare an unstretched film having a thickness of 170 μm. The electrostatic application was carried out with KHD-15K01PN manufactured by Kasuga Electric Works, Ltd. under conditions where a voltage of 5 kV was applied to a tungsten wire electrode having a diameter of 0.05 mm. Upon closely attaching the molten resin sheet to a cooling roll by the electrostatic application method, the close attached point was stable and no surging of a resin film edge was observed. As a result, the appearance of the resulting unstretched sheet was good.

The obtained unstretched sheet was heated to a film temperature of 100° C. by a group of rolls each heated to 78° C., and thereafter stretched in MD direction at 3.5 times by a group of rolls differing in peripheral speed.

Subsequently, the obtained uniaxially stretched film was held with clips and stretched in TD direction. The temperature for stretching in TD direction was set to 120° C. and the stretch ratio was set to 4.0 times. Subsequently; the film was subjected to a heat fixation treatment at 240° C. for 15 seconds, and then subjected to a 4% relaxation treatment at 185° C. to obtain a biaxially stretched polyethylene terephthalate film having a thickness of 12 μm. The physical properties of the obtained film are shown in Table 1.

COMPARATIVE EXAMPLE 2

Polyethylene-2,5-furandicarboxylate with an intrinsic viscosity of 0.90 dL/g manufactured by Avantium was used as a raw material. The raw material was dried under reduced pressure (1 Torr) at 100° C. for 24 hours to decrease its water content to 100 ppm or less, and then was fed to a twin screw extruder (screw diameter: 30 mm, L/D=25). The raw material fed to the twin screw extruder was melted and extruded into a sheet-like form through a T-die (a metal cap) while the resin temperature was kept at 240° C. from the melting part to the gear pump through the kneading part and the polymer tube (tube for melted raw material) of the extruder and kept at 240° C. in the subsequent polymer tube (tube for melted raw material). The temperature of the extruded molten resin sheet was 240° C.

The extruded resin was cast on a cooling drum having a surface temperature of 20° C., and was attempted to be closely attached to the surface of the cooling drum by an electrostatic application method and thereby cooled and solidified. However, edges of the molten film were disturbed, and this disturbance hindered stable casting so that the appearance of the molten film was poor. These results impeded stretch in the following stretching step, obtaining no biaxially stretched film.

COMPARATIVE EXAMPLE 3

Polyethylene-2,5-furandicarboxylate with an intrinsic viscosity of 0.90 dl/g manufactured by Avantium was used as a raw material. The raw material was dried under reduced pressure (1 Torr) at 100° C. for 24 hours to decrease its water content to 100 ppm or less, and then was fed to a twin screw extruder (screw diameter: 30 mm, L/D=25). The raw material fed to the twin screw extruder was melted and extruded into a sheet-like form through a T-die (a metal cap) while the resin temperature was kept at 320° C. from the melting part to the gear pump through the kneading part and the polymer tube (tube for melted raw material) of the extruder and kept at 320° C. in the subsequent polymer tube (tube for melted raw material). The temperature of the extruded molten resin sheet was 320° C.

The extruded resin was cast on a cooling drum having a surface temperature of 20° C., and was attempted to be closely attached to the surface of the cooling drum by an electrostatic application method and thereby cooled and solidified. However, close attachment points and edges of the molten film were disturbed, and these disturbances hindered stable casting so that the appearance of the molten film was poor. These results impeded stretch in the following stretching step, obtaining no biaxially stretched film.

REFERENCE EXAMPLE 1

The unstretched film with a thickness of 250 μm obtained in Example 1 was taken as Reference Example 1.

REFERENCE EXAMPLE 2

The unstretched sheet obtained in Example 1 was heated by a group of rolls each heated to 100° C. to increase a film temperature thereof and thereafter stretched in MD direction at 5.0 times by a group of rolls differing in peripheral speed to obtain a uniaxially stretched film. The physical properties of the obtained film are shown in Table 1.

REFERENCE EXAMPLE 3

Film formation was carried out in the same manner as in Example 7, except that the heat fixation temperature was changed to 150° C. As a result, the film was broken in the middle of the heat fixation treatment, obtaining no biaxially stretched film.

REFERENCE EXAMPLE 4

Film formation was carried out in the same manner as in Example 8, except that the heat fixation temperature was changed to 150° C. As a result, the film was broken in the middle of the heat fixation treatment, obtaining no biaxially stretched film.

TABLE 1

| Item | | Example 1 | Example 2 | Example 3 | Example 4 | Example 5 | Example 6 | Example 7 | Example 8 | Comparative Example 1 | Comparative Example 2 | Comparative Example 3 | Reference Example 1 | Reference Example 2 | Reference Example 3 | Reference Example 4 |
|---|---|---|---|---|---|---|---|---|---|---|---|---|---|---|---|---|
| Raw material | | PEF | PEF | PEF | PEF | PEF | PEF | PEF | PEF | PET | PEF | PEF | PEF | PEF | PEF | PEF |
| Intrinsic viscosity of raw material | (dL/g) | 0.90 | 0.90 | 0.90 | 0.90 | 0.90 | 0.90 | 0.75 | 0.90 | 0.62 | 0.90 | 0.90 | 0.90 | 0.90 | 0.75 | 0.90 |
| Melt specific resistance value at 275° C. | (×10⁸ Ω·cm) | 0.11 | 0.11 | 0.11 | 0.11 | 0.11 | 0.11 | 0.10 | 0.11 | 0.24 | 0.11 | 0.11 | 0.11 | 0.11 | 0.09 | 0.11 |
| Intrinsic viscosity of extruded sheet | (dL/g) | 0.71 | 0.71 | 0.71 | 0.71 | 0.71 | 0.71 | 0.52 | 0.71 | 0.59 | 0.75 | 0.55 | 0.71 | 0.71 | 0.52 | 0.71 |
| Temperature of molten resin when extruded from a T-die outlet | ° C. | 275 | 275 | 275 | 275 | 275 | 275 | 275 | 275 | 275 | 240 | 320 | 275 | 275 | 275 | 275 |
| Melt specific resistance value of raw material measured at the temperature of molten resin at a T-die outlet | (×10⁸ Ω·cm) | 0.11 | 0.11 | 0.11 | 0.11 | 0.11 | 0.11 | 0.09 | 0.11 | 0.24 | 0.36 | 0.08 | 0.11 | 0.11 | 0.09 | 0.11 |
| Stability of casting step | (—) | A | A | A | A | A | A | A | A | A | B | C | A | A | A | A |
| Intrinsic viscosity of stretched film | (dL/g) | 0.71 | 0.71 | 0.71 | 0.71 | 0.71 | 0.71 | 0.71 | 0.71 | 0.59 | — | — | 0.71 | 0.71 | — | — |
| Stretch ratio in MD direction | (—) | 5 | 5 | 5 | 5 | 4 | 5 | 5 | 3.4 | 3.5 | — | — | — | 5 | 2.5 | 3.4 |
| Stretch temperature in MD direction | (° C.) | 120 | 120 | 120 | 120 | 110 | 110 | 110 | 110 | 100 | — | — | — | 100 | 95 | 110 |
| Stretch ratio in TD direction | (—) | 5 | 5 | 5 | 5 | 4 | 4 | 4 | 4 | 4 | — | — | — | — | 3 | 4 |
| Stretch temperature in TD direction | ° C. | 105 | 105 | 105 | 105 | 105 | 105 | 105 | 105 | 120 | — | — | — | — | 85 | 105 |
| Heat fixation temperature | ° C. | 200 | 200 | 180 | 140 | 120 | 120 | 120 | 120 | 240 | — | — | — | — | 150 | 150 |
| Relaxation ratio in TD direction | % | 5 | 5 | 5 | 5 | 5 | 5 | 5 | 5 | 4 | — | — | — | — | — | — |
| Relaxation temperature in TD direction | ° C. | 190 | 190 | 170 | 130 | 110 | 110 | 110 | 110 | 185 | — | — | — | — | — | — |
| Thickness | (μm) | 12.0 | 15.5 | 11.9 | 11.5 | 19.2 | 19.5 | 19.5 | 22.8 | 12.0 | — | — | 250 | 50.0 | — | — |
| Plane orientation coefficient (ΔP) | | 0.143 | 0.147 | 0.142 | 0.139 | 0.028 | 0.122 | 0.024 | 0.039 | 0.168 | casting step was unstable | casting step was unstable | 0.001 | 0.040 | film was broken | film was broken |
| Breaking strength MD | (MPa) | 275 | 250 | 215 | 209 | 190 | 310 | 94 | 129 | 230 | — | — | 49 | not measured | — | — |
| Breaking strength TD | (MPa) | 252 | 255 | 218 | 225 | 195 | 258 | 134 | 141 | 240 | — | — | 42 | not measured | — | — |
| Breaking elongation MD | (%) | 47 | 47 | 27 | 31 | 64 | 38 | 11 | 166 | 100 | — | — | 1 | not measured | — | — |
| Breaking elongation TD | (%) | 46 | 42 | 31 | 26 | 64 | 47 | 69 | 154 | 90 | — | — | 1 | not measured | — | — |
| Refractive index Nx | (—) | 1.6317 | 1.6292 | 1.6316 | 1.6231 | 1.5767 | 1.6177 | 1.5650 | 1.5700 | 1.6537 | — | — | 1.5663 | 1.6053 | — | — |
| Refractive index Ny | (—) | 1.6219 | 1.6242 | 1.6205 | 1.6200 | 1.5705 | 1.6038 | 1.5780 | 1.5782 | 1.6732 | — | — | 1.5640 | 1.5523 | — | — |
| Refractive index Nz | (—) | 1.4839 | 1.4801 | 1.4837 | 1.4825 | 1.5451 | 1.4836 | 1.5480 | 1.5347 | 1.4959 | — | — | 1.5644 | 1.5385 | — | — |

TABLE 1-continued

| Item | | | Example 1 | Example 2 | Example 3 | Example 4 | Example 5 | Example 6 | Example 7 | Example 8 | Comparative Example 1 | Comparative Example 2 | Comparative Example 3 | Reference Example 1 | Reference Example 2 | Reference Example 3 | Reference Example 4 |
|---|---|---|---|---|---|---|---|---|---|---|---|---|---|---|---|---|---|
| Heat shrinkage rate | MD | (%) | 3.3 | 4.3 | 5.5 | 22 | 29 | 29 | 21 | 43 | 1.4 | | | Measurement error | 63 | | |
| | TD | (%) | 4.3 | 4.3 | 7.1 | 28 | 36 | 49 | 27 | 45 | 0.2 | | | Measurement error | 4.0 | | |
| Haze | | (%) | 0.39 | 0.3 | 0.25 | 0.17 | 2.9 | 1.3 | 0.78 | 1.2 | 2.3 | | | 0.8 | 0.5 | | |
| Total light transmittance | | (%) | 88.9 | 89.1 | 89 | 89.2 | 90.4 | 89.8 | 89.9 | 90.4 | 88 | | | 88 | 89 | | |
| Thickness | | (μm) | 12.0 | 15.5 | 11.9 | 11.6 | 19.2 | 19.5 | 18.8 | 22.8 | 12.0 | | | 250 | 50.0 | | |
| Oxygen transmission rate | Measured value | (mL/m²/day/MPa) | 107 | 85 | 103 | 124 | 108 | 94 | 121 | 114 | 1200 | | | 8.4 | not measured | | |
| | per 50 μm | (mL/m²/day/MPa) | 25.7 | 26.4 | 24.4 | 28.8 | 41.4 | 36.6 | 56.2 | 52.2 | 288 | | | 42.0 | not measured | | |
| Water vapor transmission rate | Measured value | (g/m²/day) | 15.6 | 10.8 | 15.3 | 17.8 | 13.8 | 11.5 | 8.4 | 15.0 | 46.0 | | | 2.1 | not measured | | |
| | per 50 μm | (g/m²/day) | 3.7 | 3.3 | 3.6 | 4.1 | 5.3 | 4.5 | 3.2 | 5.8 | 11.0 | | | 10.5 | not measured | | |
| Oxygen permeability test of packaging bag | | | A | A | A | A | A | A | A | A | B | | | A | A | | |
| Test of heat resistance of film | | | A | A | B | C | C | D | C | D | A | | | C | D | | |

Melt specific resistance values of the following four resins were measured at temperatures of 240° C., 250° C., 260° C., 270° C., 275° C., 280° C., and 320° C.: the polyethylene-2,5-furandicarboxylate used in Example 1 (the intrinsic viscosity was 0.90 dL/g), the polyethylene-2,5-furandicarboxylate used in Example 7 (the intrinsic viscosity was 0.75 dL/g), a polyethylene-2,5-furandicarboxylate having an intrinsic viscosity of 0.62 dL/g, and the PET resin (A) used in Comparative Example 1 (the intrinsic viscosity was 0.62 dL/g). The measurement results are shown in Table 2. The melt specific resistance value of the PET resin (A) could not be measured at 240° C., 250° C., and 260° C.

TABLE 2

| Raw material | Resin properties | | Melt specific resistance value ($\times 10^7$ Ω·cm) | | | | | | |
|---|---|---|---|---|---|---|---|---|---|
| | Intrinsic viscosity (dL/g) | Melting point (° C.) | 240° C. | 250° C. | 260° C. | 270° C. | 275° C. | 280° C. | 320° C. |
| PEF | 0.90 | 215 | 3.6 | 2.4 | 1.7 | 1.3 | 1.1 | 1.0 | 0.8 |
| PEF | 0.75 | 215 | 3.2 | 2.2 | 1.5 | 1.1 | 1.0 | 0.9 | 0.7 |
| PEF | 0.62 | 215 | 2.9 | 1.9 | 1.3 | 1.1 | 0.9 | 0.3 | 0.6 |
| PET | 0.62 | 255 | measurement error | measurement error | measurement error | 2.9 | 2.7 | 2.4 | 1.6 |

The invention claimed is:

1. A method for producing a biaxially oriented polyester film, comprising:
   a step of feeding a polyester resin into an extruder to form a molten polyester resin,
   a step of extruding the molten polyester resin from the extruder to obtain a molten resin sheet at 250 to 310° C.,
   a step of attaching the molten resin sheet to a cooling roll by an electrostatic application method to obtain an unstretched sheet,
   a step of biaxially stretching the unstretched sheet in a machine direction at 4.5 to 10.0 times, and then in a direction perpendicular to the machine direction to obtain a stretched film,
   a step of heat fixing while the stretched film is kept stretched in the direction perpendicular to the machine direction, and
   a step of relaxing in the direction perpendicular to the machine direction at a relaxation ratio of 0.5 to 10%,
   wherein
   the step of heat fixing is followed by the step of relaxing,
   an intrinsic viscosity of the molten resin sheet is 0.60 to 1.20 dL/g, and
   a plane orientation coefficient of the biaxially oriented polyester film is 0.100-0.200, and
   the polyester resin fulfills the following (A) to (C):
   (A) the polyester resin comprises a polyethylene furandicarboxylate resin composed of a furandicarboxylic acid and ethylene glycol;
   (B) an intrinsic viscosity of the polyester resin is 0.50 dL/g or more; and
   (C) a melt specific resistance value at 250° C. of the polyester resin is $3.0 \times 10^7$ Ω·cm or less.

2. The method for producing a biaxially oriented polyester film according to claim 1, wherein a melt specific resistance value of the molten resin sheet is $2.5 \times 10^7$ Ω·cm or less at a temperature at which the molten resin sheet is extruded from the extruder.

3. The method for producing a biaxially oriented polyester film according to claim 2, wherein the melt specific resistance value of the polyester resin at 275° C. is $2.5 \times 10^7$ Ω·cm or less.

4. The method for producing a biaxially oriented polyester film according to claim 3, wherein the step of obtaining an unstretched sheet and the step of biaxially stretching the unstretched sheet are carried out continuously.

5. The method for producing a biaxially oriented polyester film according to claim 4, wherein a thickness of the film is 1 μm or more and 300 μm or less.

6. The method for producing a biaxially oriented polyester film according to claim 5, wherein the polyester film has a heat shrinkage rate of 0.01% or more and 50% or less when the polyester film is heated at 150° C. for 30 minutes.

7. The method for producing a biaxially oriented polyester film according to claim 6, wherein the film has an oxygen transmission of 1 mL/m$^2$/day/MPa or more and 200 mL/m$^2$/day/MPa or less per 50 μm of film thickness at a temperature of 23° C. and a relative humidity of 65%.

8. The method for producing a biaxially oriented polyester film according to claim 7, wherein both a refractive index (nx) of the film in a flow direction in the film plane and a refractive index (ny) of the film in a transverse direction perpendicular to the flow direction in the film plane are 1.5700 or more and 1.7000 or less.

9. The method for producing a biaxially oriented polyester film according to claim 1, wherein the melt specific resistance value of the polyester resin at 275° C. is $2.5 \times 10^7$ 106·cm or less.

10. The method for producing a biaxially oriented polyester film according to claim 1, wherein the step of obtaining an unstretched sheet and the step of biaxially stretching the unstretched sheet are carried out continuously.

11. The method for producing a biaxially oriented polyester film according to claim 1, wherein a thickness of the film is 1 μm or more and 300 μm or less.

12. The method for producing a biaxially oriented polyester film according to claim 1, wherein the polyester film has a heat shrinkage rate of 0.01% or more and 50% or less when the polyester film is heated at 150° C. for 30 minutes.

13. The method for producing a biaxially oriented polyester film according to claim 1, wherein the film has an oxygen transmission of 1 mL/m$^2$/day/MPa or more and 200 mL/m$^2$/day/MPa or less per 50 μm of film thickness at a temperature of 23° C. and a relative humidity of 65%.

14. The method for producing a biaxially oriented polyester film according to claim 1, wherein both a refractive index (nx) of the film in a flow direction in the film plane and a refractive index (ny) of the film in a transverse direction perpendicular to the flow direction in the film plane are 1.5700 or more and 1.7000 or less.

* * * * *